United States Patent
King et al.

(10) Patent No.: US 11,775,472 B2
(45) Date of Patent: Oct. 3, 2023

(54) SYSTEM AND METHOD FOR A PREDICTIVE APPLICATION AND DATA MIGRATION BASED ON EXTERNAL SOURCE EVENT PROBABILITY AND APPLICATION PRIORITY ACROSS LOCAL DATA SYSTEMS

(71) Applicant: EMC IP Holding Company LLC, Hopkinton, MA (US)

(72) Inventors: James Robert King, Norwood, MA (US); Nicole Reineke, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 696 days.

(21) Appl. No.: 16/775,690

(22) Filed: Jan. 29, 2020

(65) Prior Publication Data

US 2021/0232535 A1    Jul. 29, 2021

(51) Int. Cl.
| | | |
|---|---|---|
| *G06F 16/11* | (2019.01) | |
| *G06F 16/17* | (2019.01) | |
| *G06F 11/20* | (2006.01) | |
| *G06F 9/54* | (2006.01) | |
| *G06N 20/00* | (2019.01) | |
| *G06F 11/30* | (2006.01) | |

(52) U.S. Cl.
CPC ............ *G06F 16/119* (2019.01); *G06F 9/542* (2013.01); *G06F 11/203* (2013.01); *G06F 11/3034* (2013.01); *G06F 16/1734* (2019.01); *G06N 20/00* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 9,297,723 B1* | 3/2016 | Hofmann | G06N 20/00 |
| 2018/0283896 A1* | 10/2018 | Piemonte | G01C 21/367 |
| 2019/0080055 A1* | 3/2019 | Bettencourt Da Silva | |
| | | | G16H 40/63 |
| 2020/0231298 A1* | 7/2020 | Bilek | G08G 5/0091 |

* cited by examiner

*Primary Examiner* — Thu N Nguyen
(74) *Attorney, Agent, or Firm* — Chamberlain, Hrdlicka, White, Williams & Aughtry (57) ABSTRACT

A method for managing data includes obtaining, by a data migration manager, a notification of an event occurrence from an external event source, wherein the event occurrence is predicted to take place in a geographical location, performing a threat assessment on the event occurrence to generate an impact prediction for a local data system located in the geographical location, making a first determination that the impact prediction exceeds an impact threshold for a first application executing in the local data system, performing, in response to the first determination, a location assessment to identify a migration destination for first application data stored in the local data system, and initiating a first data migration of the first application data to the migration destination.

20 Claims, 8 Drawing Sheets

SYSTEM AND METHOD FOR A PREDICTIVE APPLICATION AND DATA MIGRATION BASED ON EXTERNAL SOURCE EVENT PROBABILITY AND APPLICATION PRIORITY ACROSS LOCAL DATA SYSTEMS

BACKGROUND

Computing devices may include functionality to store data associated with an application. The computing devices may be located in various geographic locations. Real-life events may affect the storage of the data in each geographic location.

SUMMARY

In general, in one aspect, the invention relates to a method for managing data. The method includes obtaining, by a data migration manager, a notification of an event occurrence from an external event source, wherein the event occurrence is predicted to take place in a geographical location, performing a threat assessment on the event occurrence to generate an impact prediction for a local data system located in the geographical location, making a first determination that the impact prediction exceeds an impact threshold for a first application executing in the local data system, performing, in response to the first determination, a location assessment to identify a migration destination for first application data stored in the local data system, and initiating a first data migration of the first application data to the migration destination.

In general, the invention relates to a non-transitory computer readable medium that includes computer readable program code, which when executed by a computer processor enables the computer processor to perform a method for managing data. The method includes obtaining, by a data migration manager, a notification of an event occurrence from an external event source, wherein the event occurrence is predicted to take place in a geographical location, performing a threat assessment on the event occurrence to generate an impact prediction for a local data system located in the geographical location, making a first determination that the impact prediction exceeds an impact threshold for a first application executing in the local data system, performing, in response to the first determination, a location assessment to identify a migration destination for first application data stored in the local data system, and initiating a first data migration of the first application data to the migration destination.

In general, in one aspect, the invention relates to a system that includes a processor and memory that includes instructions, which when executed by the processor, perform a method for managing data. The method includes obtaining, by a data migration manager, a notification of an event occurrence from an external event source, wherein the event occurrence is predicted to take place in a geographical location, performing a threat assessment on the event occurrence to generate an impact prediction for a local data system located in the geographical location, making a first determination that the impact prediction exceeds an impact threshold for a first application executing in the local data system, performing, in response to the first determination, a location assessment to identify a migration destination for first application data stored in the local data system, and initiating a first data migration of the first application data to the migration destination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to a system and method for obtaining information about event occurrences from multiple external sources, predicting an impact of the event occurrences on data stored in a similar geographic location to the event occurrences, and migrating the data based on a determination that the event occurrences may negatively impact the data. The data may be migrated to a non-impacted geographic location (or a geographic location in which there is a lower likelihood of an impact). The data may be migrated based on pre-determined priority of the data, based on migration policies of the data, and/or based on another factors without departing from the invention.

Figure 1A:
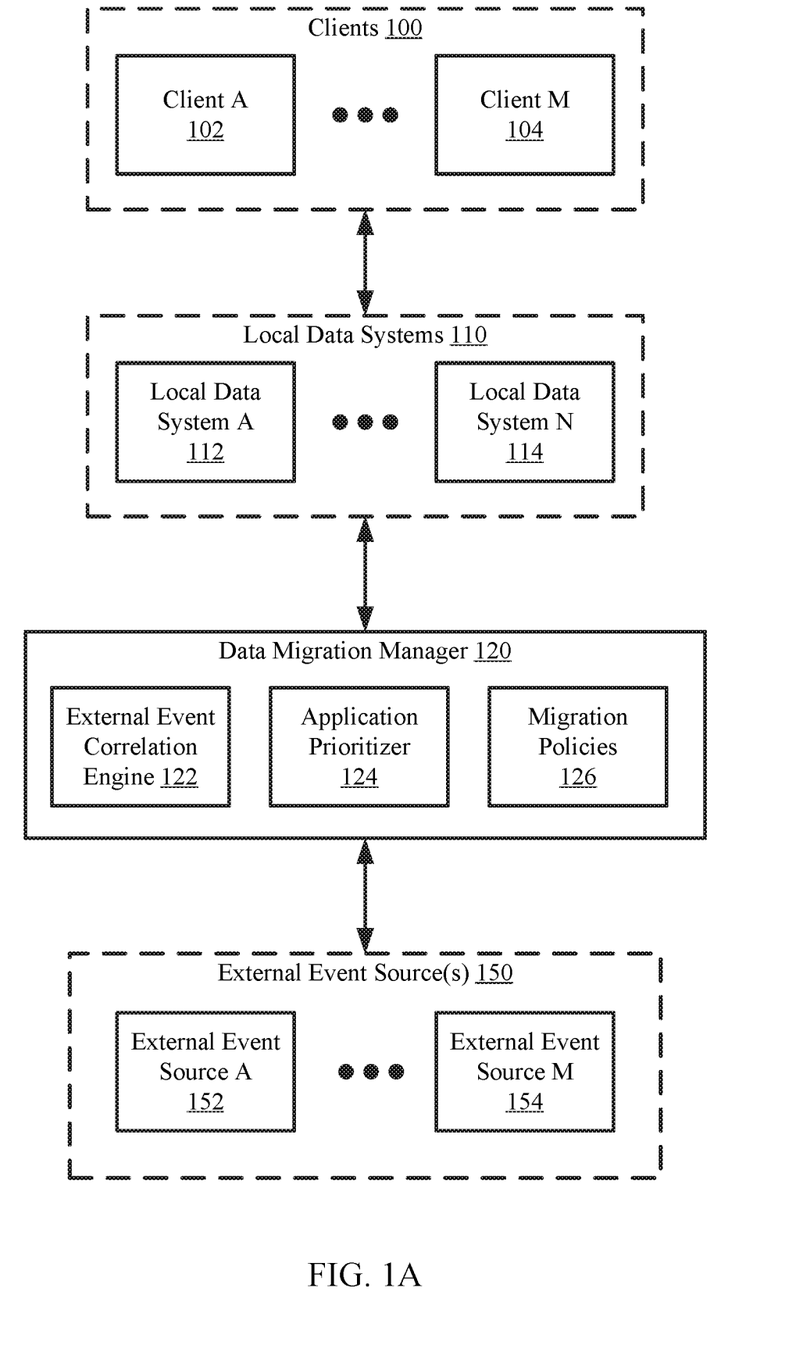
FIG. 1A shows a diagram of a system in accordance with one or more embodiments of the invention.

FIG. 1A shows a diagram of a system in accordance with one or more embodiments of the invention. The system may include clients (100), local data systems (110), a data migration manager (120), and external event source(s) (150). Each component may be operably connected to any of the other components via any combination of wired and/or wireless connections. Each of the aforementioned components is discussed below.

In one or more embodiments of the invention, the clients (100) utilize the services of the local data systems (110). Specifically, the clients may read, write, monitor, and/or otherwise access data from the local data systems (110). The data may be data associated with one or more applications. Each client (102, 104) may include functionality to initiate requests to store data to the local data systems (110) using the applications executing on the local data systems.

Figure 4:
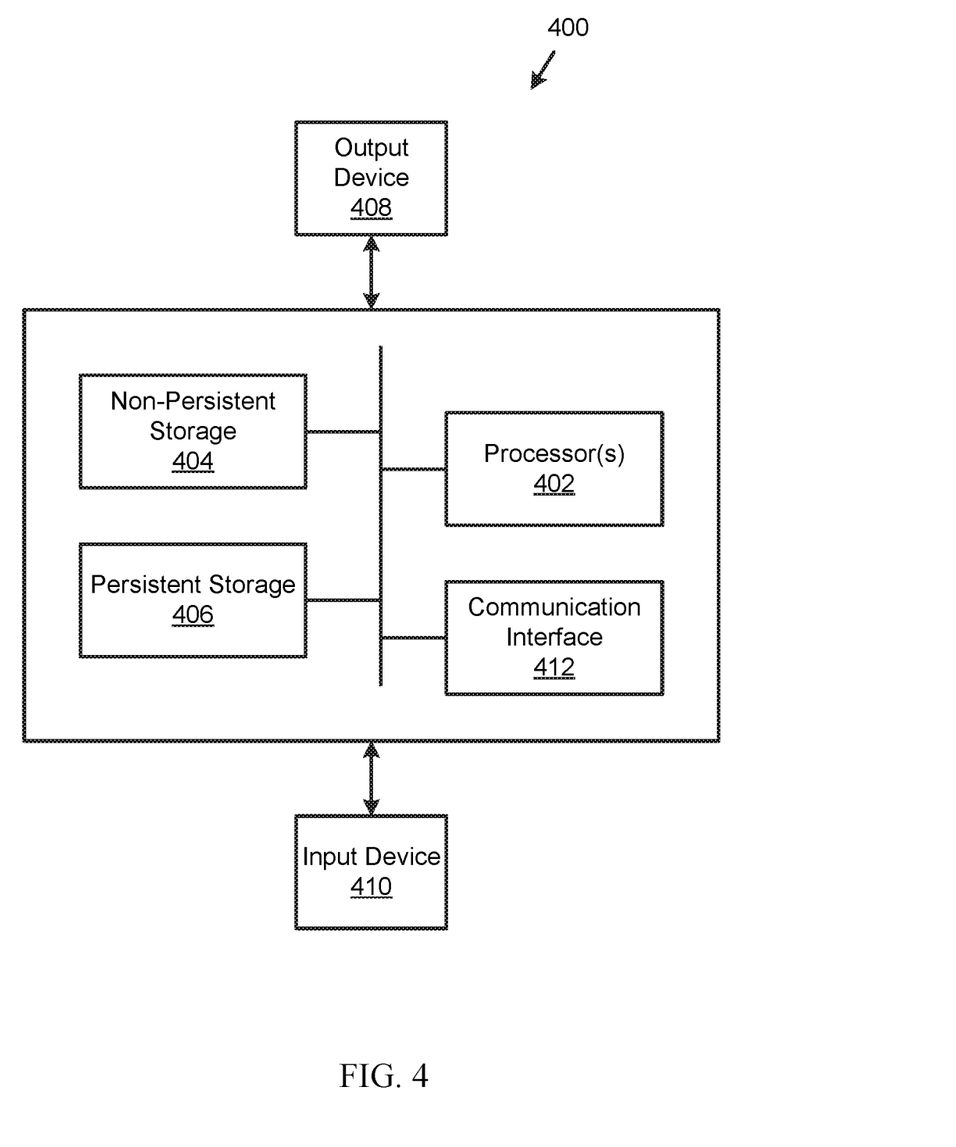
FIG. 4 shows a diagram of a computing device in accordance with one or more embodiments of the invention.

In one or more embodiments of the invention, a client (102, 104) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the local data systems (110) manage data. The data may be data associated with an application executing on the local data systems. Further, the data may be data migrated from a second local data system. Each local data system (112, 114) may also include functionality to migrate its data to a second local data system (112, 114) in accordance with a data migration initiated by the data migration manager (120).

In one or more embodiments of the invention, each local data system (112, 114) is located in a geographic location that may not be similar to the other local data systems (112, 114) in the system of FIG. 1A. In other words, the local data systems (110) are located in varying geographic locations.

In one or more embodiments of the invention, each local data system (112, 114) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data migration manager (120) described throughout this application.

In one or more embodiments of the invention, each local data system (112, 114) is implemented as a logical device. The logical device may utilize the computing resources of any number of computing devices and thereby provide the functionality of the data migration manager (120) described throughout this application. The logical device may be, for example, a cloud service. Each computing device in the cloud service may communicate with other computing devices in the cloud service via any protocol such as, for example, transmission control protocol (TCP), hypertext transfer protocol (HTTP), internet protocol (IP), and/or any other protocol without departing from the invention. For additional details regarding the local data systems, see, e.g., FIG. 1B.

In one or more embodiments of the invention, the data migration manager (120) manages the data stored in the storage systems (110). The data migration manager (150) may manage the data by utilizing information obtained from the external event source(s) (150) to predict future impact to the data. To perform the aforementioned functionality, the data migration manager includes an external event correlation engine (122), an application prioritizer (124), and migration policies (126). The data migration manager (120) may include additional, fewer, and/or different components without departing from the invention. Each of the aforementioned components is discussed below.

In one or more embodiments of the invention, the external event correlation engine (122) manages the correlation of event occurrences specified by the external event sources (150). Specifically, the external event correlation engine (122) may obtain notifications of event occurrences from the external event sources (150) and store the notifications in a current events catalog. The external event correlation service (122) may implement a machine learning algorithm (discussed in FIG. 2A) to generate a threat assessment model. The threat assessment model may use characteristics of the event occurrence such as the type of event, a radius of the event, and a severity of the event to generate an impact prediction (discussed in FIG. 2A).

In one or more embodiments of the invention, the impact prediction is a numerical representation of the likelihood that the event occurrence will negatively affect the storage and/or accessibility of data by local data systems (110) in the geographical locations. The numerical representation may be, for example, a percentage.

In one or more embodiments of the invention, the type of event of an event occurrence impacts the impact prediction. Non-limiting examples of types of events include, but are not limited to, bad weather (e.g., hurricanes, tornados, etc.), forest fires, cyber-security threats, terrorist attacks, and earthquakes. Each type of event may have a different impact to the local data systems (112, 114). For example, heavy rain may not affect local data systems located at the top of a skyscraper building as much as a cyber-security threat may.

In one or more embodiments of the invention, the severity of the event is a measurement of a potential destructive force/potential of the event occurrence. For example, hurricane severity may be categorized based on a Saffir-Simpson Hurricane Wind Scale. For example, a category four hurricane may be more severe than a category one hurricane.

In one or more embodiments of the invention, the radius of the event is a prediction of the geographical range in which the event occurrence may take place. For example, a forest fire may be expected to affect a specified geographic location. That specified location may be the radius of the event.

In one or more embodiments of the invention, the external event correlation engine (122) is implemented as computer instructions, e.g., computer code, stored on a persistent storage of the data migration manager (120) that when executed by a processor of the data migration manger (120) cause the data migration manager (120) to provide the functionality of the external event correlation engine (122) described throughout this application.

In one or more embodiments of the invention, the application prioritizer (124) obtains application information (discussed below in FIG. 1B) from the local data systems (110) to determine priorities of applications executing on each local data system (112, 114). The application information may be used to assign a relative priority of each application. For example, the application information may specify a high frequency of usage by the clients (100) and/or specify a large amount of sensitive information that has been encrypted. The application prioritizer may assign a relative priority of "high priority" to such applications. The relative priority may be, for example, a numerical representation (e.g., "one" for high priority, "three" for low priority) without departing from the invention. The relative priority may be specified and stored in the migration policies (126).

In one or more embodiments of the invention, the application prioritizer (124) is implemented as computer instructions, e.g., computer code, stored on a persistent storage of the data migration manager (120) that when executed by a processor of the data migration manger (120) cause the data migration manager (120) to provide the functionality of the application prioritizer (124) described throughout this application.

In one or more embodiments of the invention, the migration policies (126) are data structures that specify information useful for how to handle potential impact of event occurrences. The migration policies (126) may specify each application executing on the local data system (110) and a relative priority of the application as determined by the application prioritizer (124). Further, the migration policies may specify, for each application, a set of one or more conditions that are to be met before determining to initiate a data migration of application data associated with the application.

In one or more embodiments of the invention, a criterion specified in the migration policies (126) may include an impact threshold. In one or more embodiments of the invention, an impact threshold is a number that represents a minimum amount that an impact prediction of an event occurrence is to represent in order for a data migration to be initiated.

For example, if an impact prediction of a hurricane specifies a 40% chance of negative impact on a local data system, a migration policy may specify that an impact threshold of 50% is to be met in order for a data migration to be initiated. Because the impact prediction of 40% is lower than the impact prediction of 50%, the data migration is not initiated.

In one or more embodiments of the invention, the impact prediction may be generated at multiple points in time within a predetermined period of time. A migration policy may specify an impact threshold that is to be met by an average of the impact predictions during that point in time. For example, consider a scenario in which information about a hurricane and its path of movement is regularly changing. This regular change may affect the impact prediction. As the impact prediction is calculated multiple times during a predetermined period of time, an average impact prediction may be calculated. The average impact prediction may be compared to the impact threshold at any point during the predetermined period of time to determine whether to initiate a data migration.

In one or more embodiments of the invention, the data migration manager (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data migration manager (120) described throughout this application and/or all, or a portion thereof, the methods illustrated in FIGS. 2A-2B.

In one or more embodiments of the invention, the data migration manager (120) is implemented as a logical device. The logical device may utilize the computing resources of any number of computing devices and thereby provide the functionality of the data migration manager (120) described throughout this application and/or all, or a portion thereof, the methods illustrated in FIGS. 2A-2B.

In one or more embodiments of the invention, the external event source(s) (150) track real-life events. Any portion of the real-life events (also referred to as event occurrences) tracked by the external event sources (150) may negatively impact the data stored (or the ability to access the stored data) in one or more local data systems (110). The external event source(s) (150) may include exposed application programming interfaces (APIs) that enable the data migration manager (120) to access information about the tracked real-life events. The external event source(s) (150) may send unprompted notifications of event occurrences that may negatively impact data in the local data systems (110). Alternatively, the notifications are sent in response to requests by the data migration manager (120) that specify sending a notification of a potential event occurrence.

In one or more embodiments of the invention, each external event source (152, 154) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the external event source(s) (150) described throughout this application.

In one or more embodiments of the invention, each external event source (152, 154) is implemented as a logical device. The logical device may utilize the computing resources of any number of computing devices and thereby provide the functionality of the external source (152, 154) described throughout this application.

Figure 1B:
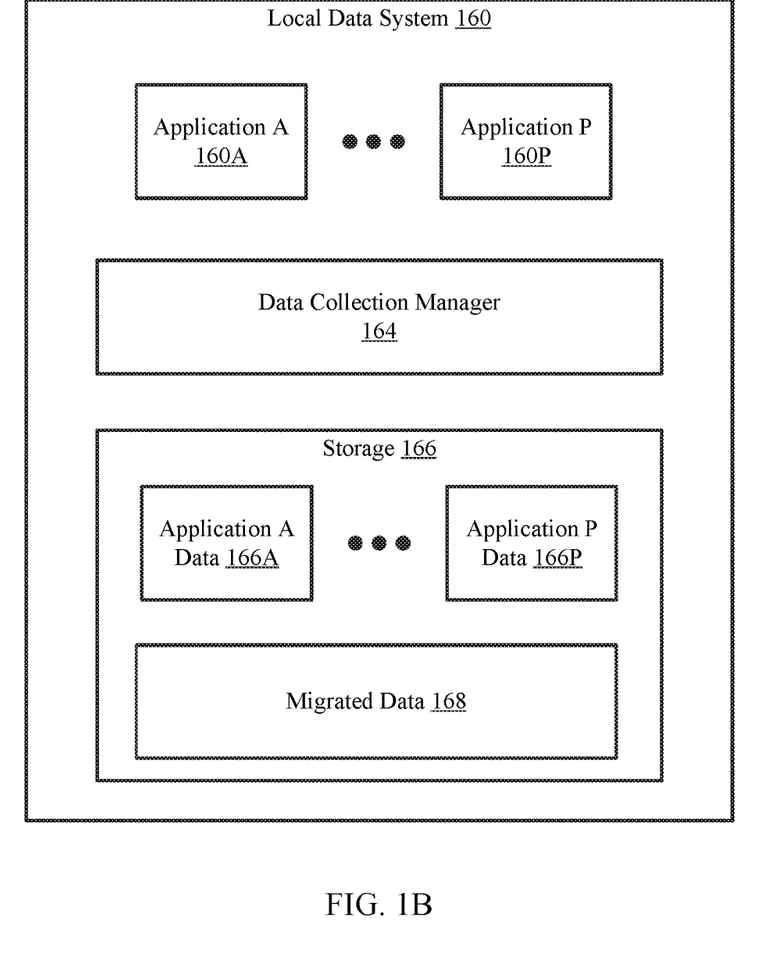
FIG. 1B shows a diagram of a local data system in accordance with one or more embodiments of the invention.

FIG. 1B shows a diagram of a local data system in accordance with one or more embodiments of the invention. The local data system (160) may be similar to a local data system (112, 114, FIG. 1A) discussed above. As discussed above, the local data system (160) may store data, execute applications (160A, 160), and collect data. The local data system (160) may include one or more application(s) (160A, 160P), a data collection manager (164), and storage (166). The local data system (160) may include additional, fewer, and/or different components. Each of the aforementioned components are discussed below.

In one or more embodiments of the invention, the application(s) (160A, 160P) are applications that enable clients (e.g., 100, FIG. 1A) to access the data in the storage (166). The user application(s) (160A, 160P) may communicate with the data collection manager (164) to read, write, and/or otherwise access data in the storage (166). Each of the applications (160A, 160P) may be performing similar or different processes. In one or more embodiments of the invention, the applications (160A, 160P) provide services to users, e.g., clients (e.g., 102, 104, FIG. 1A). The applications may be, for example, instances of databases, email servers, and/or other applications without departing from the invention.

In one or more of embodiments of the invention, each application (160A, 160P) is implemented as computer instructions, e.g., computer code, stored on a persistent storage (e.g., 166) of the local data system (160) that when executed by a processor of the local data system (160) cause the local data system (160) to provide the functionality of the application (160A, 160P) described throughout this application.

In one or more embodiments of the invention, the data collection manager (164) includes functionality to obtain application information about the local data system (160) to be provided to the data migration manager. The application information may be, for example, location information that specifies the location(s) in which the storage (166) is physically located, application usage of each application (160A, 160P), sensitivity information associated with the corresponding application data (166A, 166P), and/or any other information without departing from the invention.

In one or more embodiments of the invention, the application information may be obtained via one of the applications (160A, 160P). The application (e.g., 160A) may include functionality to track the global positioning of the local data system (160). As discussed above, the local data system (160) may be a logical device that includes more than one computing devices. The application (160A) may track the global positioning of each computing device of the local data system (160). The data collection manager (164) may send the information to the data migration manager.

In one or more embodiments of the invention, the data collection manager (164) further includes functionality to monitor each application (160A, 160P) to generate prioritization information about each application (160A, 160P) and send the prioritization information to the data migration manager.

In one or more of embodiments of the invention, the data collection manager (164) is implemented as computer instructions, e.g., computer code, stored on a persistent storage of the local data system (160) that when executed by a processor of the local data system (160) cause the local data system (160) to provide the functionality of the data collection manager (164) described throughout this application.

In one or more embodiments of the invention, the storage (166) stores data. The data may be application data (166A, 166P) obtained from the applications (160A, 160P) executing on the local data system (160). Further, the data may be migrated data (168) obtained from additional local data systems. The migrated data (168) may be obtained from the additional local data systems in response to data migration(s) initiated by the data migration manager.

In one or more embodiments of the invention, the storage (166) is non-persistent storage (e.g., volatile memory, such as random access memory (RAM), cache memory) or persistent storage (e.g., a hard disk, an optical drive such as a compact disk (CD) drive or digital versatile disk (DVD) drive, a flash memory, etc.) without departing from the invention.

Figure 2A:
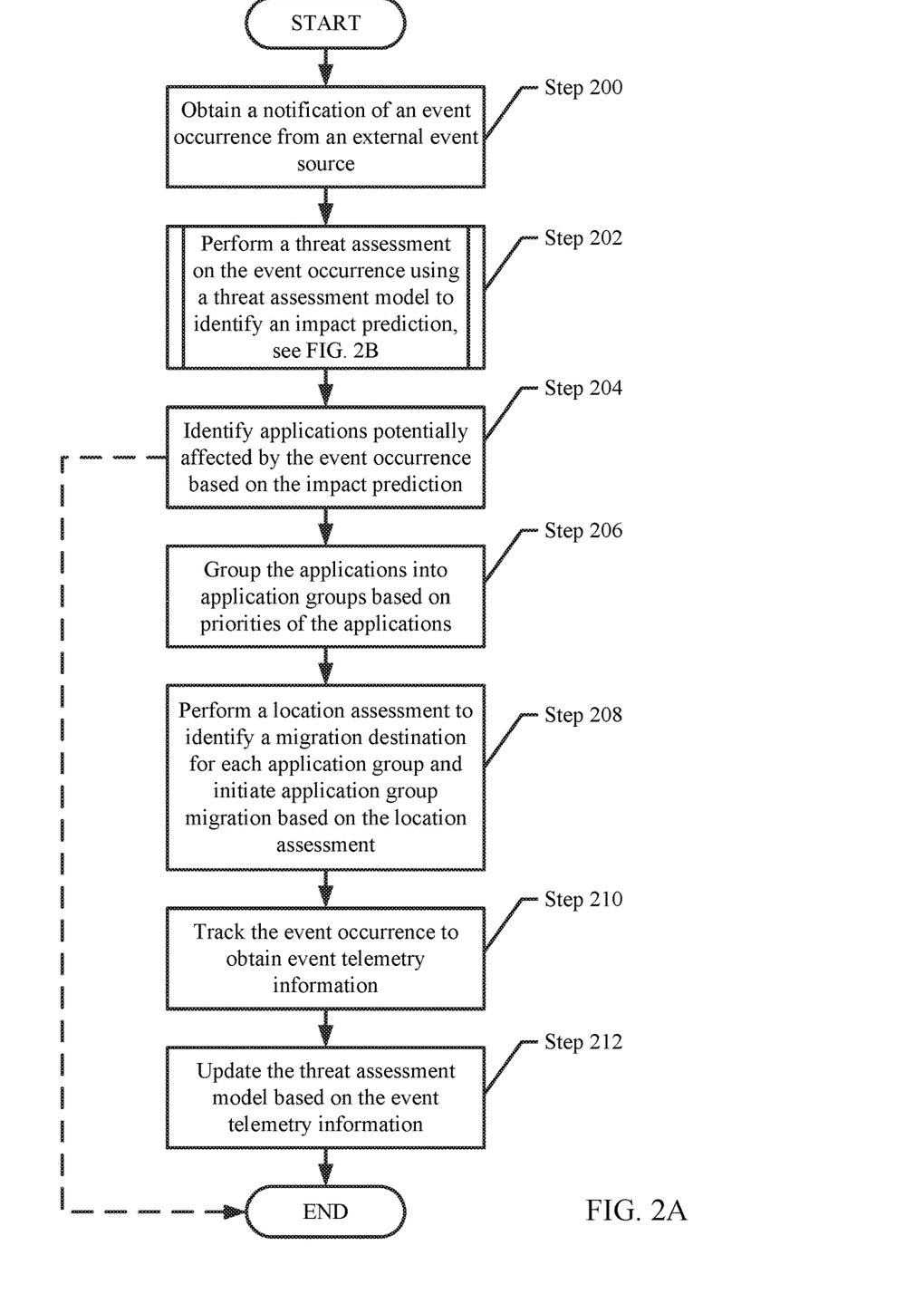
FIG. 2A shows a flowchart for initiating a data migration in accordance with one or more embodiments of the invention.
Figure 2B:
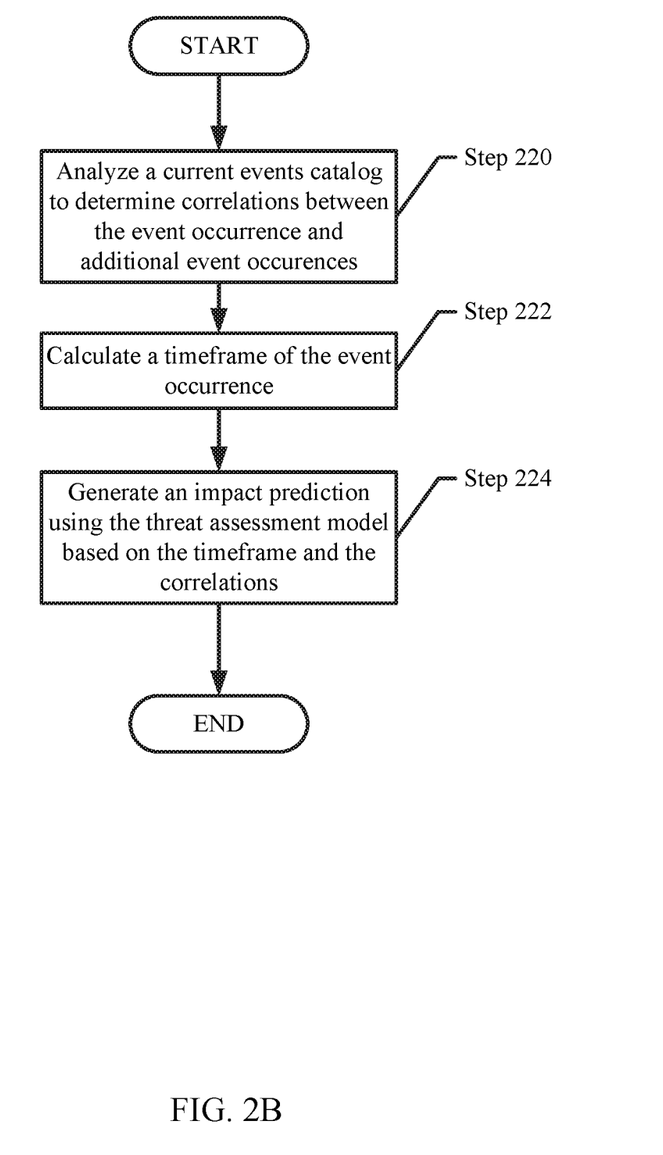
FIG. 2B shows a flowchart for performing a threat assessment in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for initiating a data migration in accordance with one or more embodiments of the invention. The method shown in FIG. 2A may be performed by, for example, a data migration manager (120, FIG. 1A). Other components of the system illustrated in FIG. 1A may perform the method of FIG. 2A without departing from the invention.

In step 200, a notification of an event occurrence is obtained from an external source. In one or more embodiments of the invention, the event occurrence may specify an event that may potentially impact the storage of data in a local data system. The event occurrence may be stored in a current events catalog to be used for any future data migration evaluations.

The event occurrence may specify a geographic location. The geographic location may be specified using a region identifier. The granularity of the region may be based on the implementation of this invention. For example, the region may be specified using coordinates (e.g., a global coordinate system, a global positioning system (GPS) coordinates, etc.), Zone Improvement Plan (ZIP) codes, city names, and/or any other types of region identifiers without departing from the invention.

In step 202, a threat assessment is performed on the event occurrence using a threat assessment model to identify an impact prediction. In one or more embodiments of the invention, the threat assessment is a method for determining a likelihood that the event occurrence will affect local data system(s) located in the geographical location specified in the notification. The threat assessment may result in an impact prediction.

In one or more embodiments of the invention, the threat assessment model is generated by implementing a machine learning algorithm. In one or more embodiments of the invention, a machine learning algorithm is a series of one or more functions that specifies relationships between any number of inputs and outputs. Examples of ML algorithms include, but are not limited to: Linear Regression, Multi-Linear Regression, Logistic Regression, Decision Tree, SVM, Naive Bayes, kNN, K-Means, Random Forest, Dimensionality Reduction Algorithms, and Gradient Boosting algorithms.

In one or more embodiments of the invention, the machine learning algorithm includes generating the threat assessment model by training a dataset that include data points with predefined inputs and outputs. The inputs may be any characteristics of an event occurrence that may affect whether the event occurrence will impact local data systems in a geographical location. Examples of the characteristics of the event occurrences may include, but are not limited to, a type of event, a severity of the event, a predicted radius of the event as obtained from the external event source, and/or any other characteristics without departing from the invention.

In one or more embodiments of the invention, the threat assessment is performed via the method illustrated in FIG. 2B. The threat assessment may be performed via other methods without departing from the invention.

In step 204, any applications potentially affected by the event occurrence are identified based on the impact prediction. In one or more embodiments of the invention, the applications are identified using migration policies that specify an impact threshold for each application. The data migration manager may determine, for each application, whether the impact prediction meets or exceeds the impact threshold of the application.

For example, if an impact prediction specifies a probability of impact of 75% (i.e., there is a 75% chance that the event occurrence will impact the local data system), and the application executing on the local data system has an impact threshold of 50%, then the application is identified as being potentially affected by the event occurrence.

In one or more embodiments of the invention, it is determined that no applications are potentially impacted by the event occurrence. Based on such determination, the method of FIG. 2A may end following step 204 as there is no data migration needed for any data.

In step 206, the applications are grouped into application groups based on priorities of the applications. In one or more embodiments of the invention, the applications with similar priorities are grouped in the same application groups. For example, all applications executing in the local data system with a high priority are grouped in an application group 1, all applications executing in the local data system with a medium priority are grouped in application group 2, and all applications executing in the local data system with a low priority are grouped in application group 3. The number of application groups may be dependent on the number of unique priorities of the applications executing in the local data system.

In step 208, a location assessment is performed to identify a migration destination for each application group. Further, an application group migration is initiated based on the location assessment. In one or more embodiments of the invention, a migration destination is identified based on a geographical location of a second local data system in which no event occurrences will occur. The data migration manager may analyze the current events catalog and select a local data system located in a geographical location that is not specified in the current events catalog. In one or more embodiments of the invention, the migration destination may be similar or different for each application group without departing from the invention.

After the migration location(s) are identified, the data migration manager initiates the data migration by sending migration requests to the local data system that specify the application groups, an ordering in which to migrate the application data of each application group, and the migration destination.

In step 210, the event occurrence is tracked to obtain event telemetry information. In one or more embodiments of the invention, the event telemetry information is tracked by obtaining measurements about the actual behavior of the event occurrence. The measurements may include, but are not limited to, whether the event occurrence occurred in the predicted location, the timeframe in which the event occurrence takes place (e.g., the point in time in which the event occurrence takes place), a radius of the event occurrence, and whether the local data system is impacted.

In step 212, the threat assessment model is updated based on the event telemetry information. In one or more embodiments of the invention, the event telemetry information is used to update the threat assessment model. For example, the event telemetry information is input to the threat assessment model to retrain it for an improved threat assessment model.

FIG. 2B shows a flowchart for performing a threat assessment of an event occurrence in accordance with one or more embodiments of the invention. The method shown in FIG. 2B may be performed by, for example, a data migration manager (120, FIG. 1A). Other components of the system illustrated in FIG. 1A may perform the method of FIG. 2B without departing from the invention.

In step 220, a current events catalog is analyzed to determine correlations between the event occurrence and additional event occurrences. In one or more embodiments of the invention, the current events catalog is analyzed by identifying the geographic location in which the event occurrence is predicted to occur and searching the current events catalog to determine whether other event occurrences are specified to occur in the identified geographic location.

In one or more embodiments of the invention, if the current events catalog specifies other event occurrences that may occur in the identified geographic location, the data migration manager increases the likelihood of impact. The other events may be of similar type to the event occurrence of FIG. 2A.

In one or more embodiments of the invention, the data migration manager may compare predictions of multiple external event sources for the same event occurrence to determine the correlations. For example, a first external event source specifies an imminent hurricane forming in the ocean. The first external event source may predict a likely path of movement for the hurricane. A second external event source specifies the same hurricane and a second path of movement that slightly varies from the first path of movement. The correlations may be determined based on the similarities between the two paths of movements. Specifically, the geographic locations specified by both paths of movement may be highly correlated.

In step 222, a timeframe of the event occurrence is calculated. In one or more embodiments of the invention, the timeframe is calculated based on the notification of the event occurrence. In other words the event occurrence specifies a point in time at which the event occurrence is predicted to occur. The timeframe may be identified by calculating the remaining time until that point in time occurs.

In one or more embodiments of the invention, the timeframe is calculated using multiple external event sources of the same event occurrence from the current events catalog. The data migration manager may calculate the timeframe by calculating a weighted average of the timeframes calculated for each external event source. The weights for each timeframe may be based on predicted accuracy of each external event source.

For example, consider a scenario in which two external event sources predict two timeframes for the arrival of a hurricane to a coastal city. The data migration manager may apply a larger weight to the timeframe of the more accurate external event source. The weighted average may be applied to the two timeframes accordingly, and the result may be the calculated timeframe.

In step 224, an impact prediction is generated using the threat assessment model based on the time frame and the correlations. In one or more embodiments of the invention, the timeframe and the correlations are input to the threat assessment model to generate the impact prediction. In one or more embodiments of the invention, other characteristics of the event occurrence (as discussed in FIG. 2A) are further input to the threat assessment model to generate an impact prediction.

While the method of FIG. 2B is illustrated as being implemented once during the data migration, in one or more embodiments of the invention, the threat assessment may be repeated for each local data system that may potentially be impacted by the event occurrence. Further, the threat assessment may be repeated at multiple points in time. As time passes, characteristics of the event occurrences get updated. For example, as time passes, a path of movement of a hurricane is updated based on measurements of the actual path of the hurricane as it moves. As such, the threat assessment of FIG. 2B may be repeated throughout the life of the event occurrence without departing from the invention.

Example

Figure 3A:
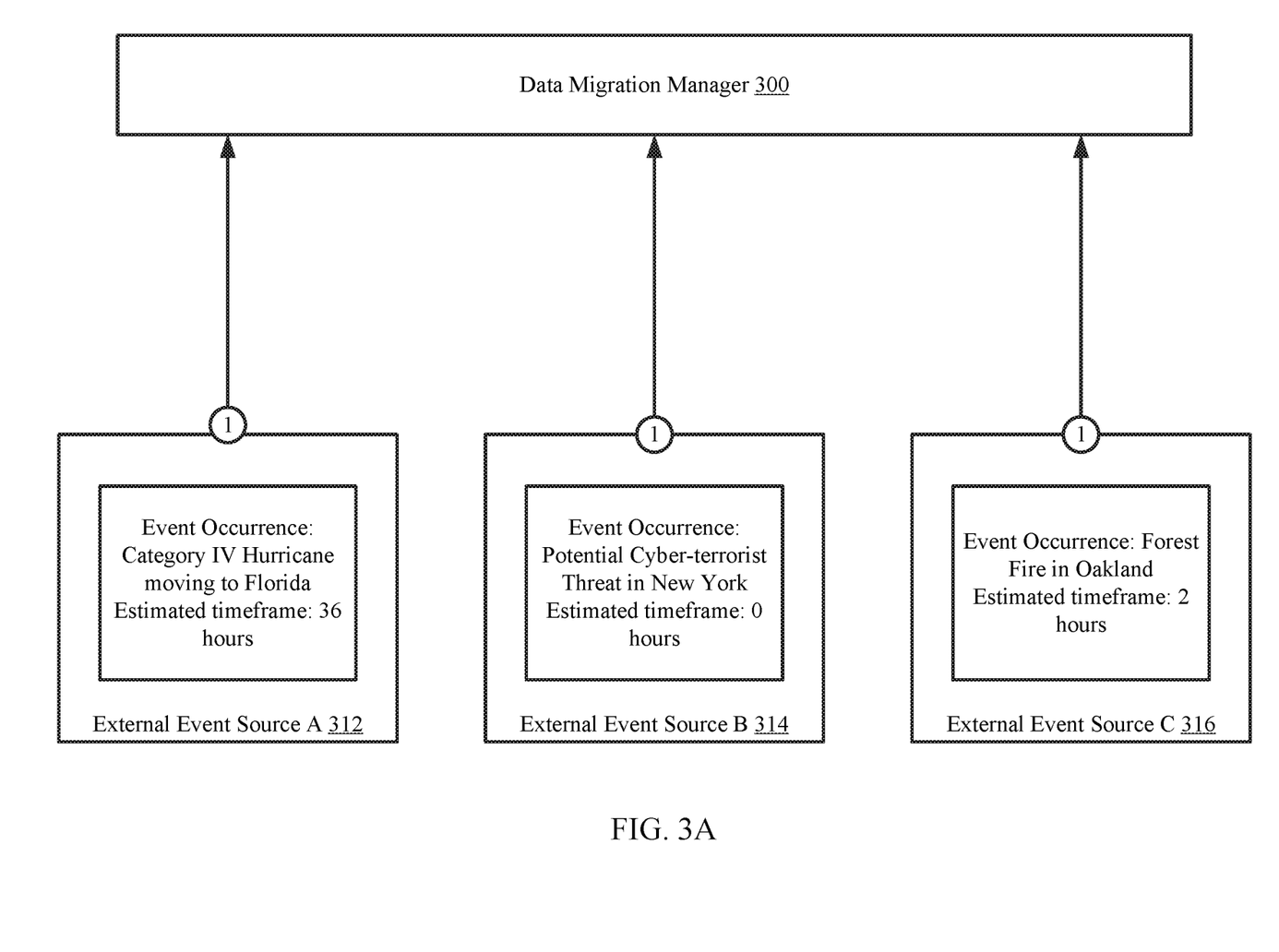
FIGS. 3A-3C show an example without departing from the invention.
Figure 3B:
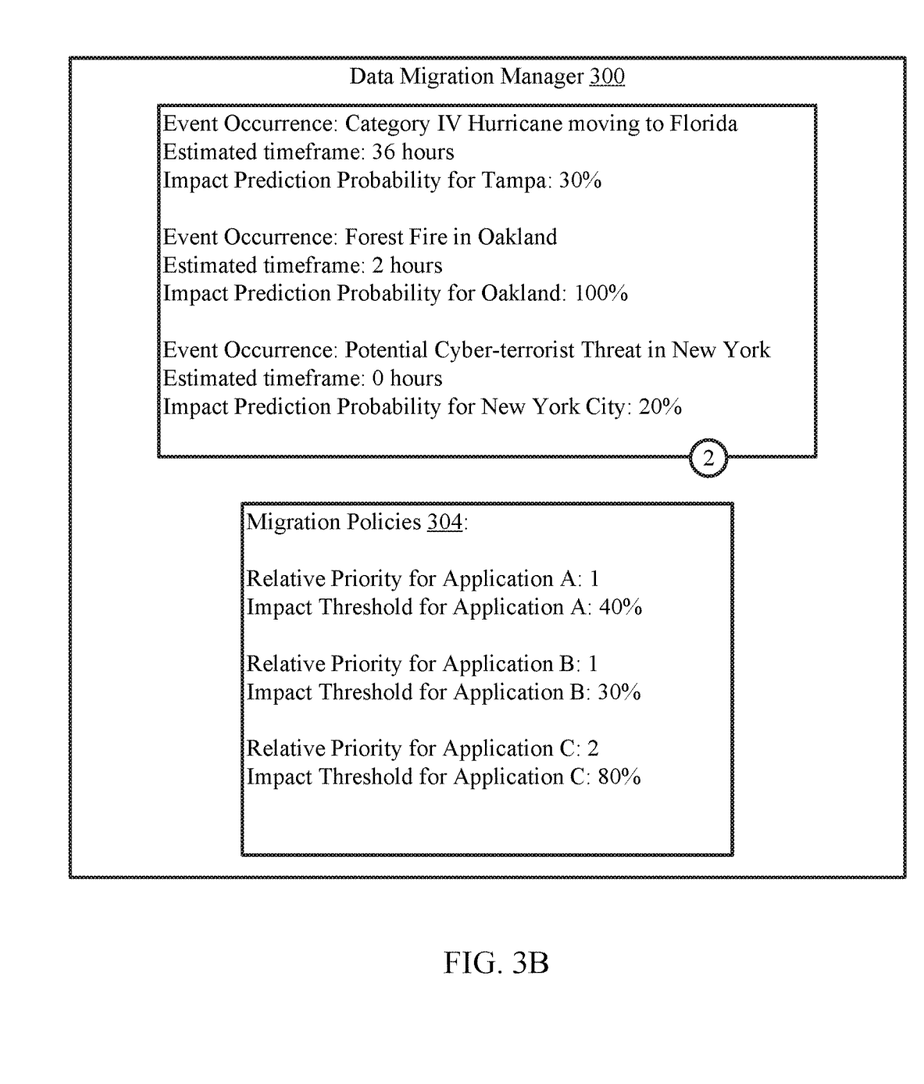
Figure 3C:
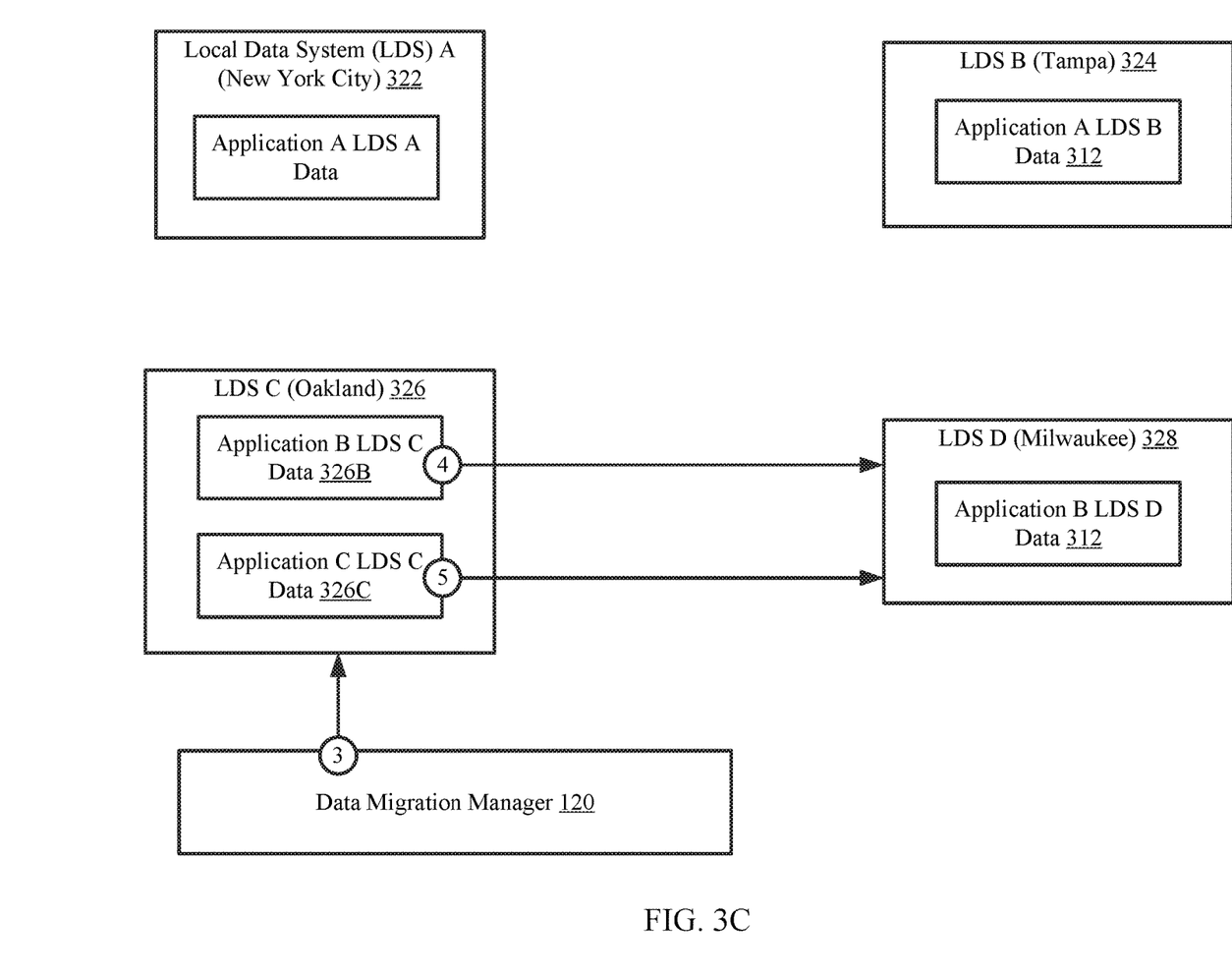

The following section describes an example. The example, illustrated in FIGS. 3A-3C, is not intended to limit the invention. Turning to the example, consider a scenario in which three notifications for three event occurrences are predicted to occur. FIG. 3A shows a first diagram of an example system in accordance with one or more embodiments of the invention. The example system includes a data migration manager (120) and three external event sources (312, 314, 316). Each external event source (312, 314, 316) specifies an event occurrence.

While not illustrated in FIG. 3A, the example system further includes a local data system located geographically in each of the following cities: Tampa, Fla.; New York City, N.Y.; Oakland, Calif.; and Milwaukee, Minn. At least one of applications A, B, and C is executing in each the aforementioned local data systems.

The first event occurrence, specified by external event source A (312), specifies a category four hurricane predicted to move toward the state of Florida in an estimated timeframe of 36 hours. The second event occurrence, specified by external event source B (314), specifies a potential cyber-terrorist threat predicted to impact local data centers located in New York City in an estimated timeframe of 0 hours (i.e., immediately). The third event occurrence, specified by external event source C (316), specifies a forest fire predicted to impact the city of Oakland in an estimated timeframe of 2 hours. Notifications for each of the aforementioned event occurrences are sent to the data migration manager (300) [1].

FIG. 3B shows the data migration manager (300) at a second point in time. The data migration manager, in response to the notifications, generates impact predictions for each event occurrence by inputting characteristics to a threat assessment model (not shown) of the data migration manager. The impact predictions are each based on the type of threat, the severity, and a radius of impact.

The impact prediction of the hurricane is based on the predicted path of the hurricane and a measurement of the severity of the hurricane (i.e., Category four) as specified by the external event source. The impact prediction of the cyber-terrorist threat is based on the security measures put in place on the data in the local data system and the prediction for which local data systems the threat is likely to target. The impact prediction of the forest fire is based on the path of movement of the forest fire as predicted by the external data source.

The result of the threat assessment model are as follows: the impact prediction for the hurricane affecting the local data system in Tampa is 30%, the impact predictions for the cyber-terrorist threat affecting the local data system in New York is 20%, and the impact prediction for the forest fire affecting the local data system in Oakland is 100%.

Based on the determined impact predictions, the data migration manager (300) compares the impact predictions to impact thresholds for each application as specified in migration policies (304). The local data system in Tampa executes application A. The migration policies (304) specify an impact threshold of 40% for application A. The impact prediction for the hurricane in Tampa 30%, which is below the impact threshold. Based on this comparison, no action is taken to the application data in the local data system in Tampa.

The local data system in New York City executes application A. The migration policies (304) specify an impact threshold of 40% for application A. The impact prediction for the cyber-terrorist attack in Tampa is 20%, which is below the impact threshold. Based on this comparison, no action is taken to the application data in the local data system in New York City.

The local data system in Oakland executes applications B and C. The migration policies (304) specify an impact threshold of 30% for application B and an impact threshold of 80% for application C. The impact prediction for the forest fire in Oakland 100%, which is above both impact thresholds for the applications in the local data system. Based on this comparison, a determination is made to migrate the application data in the local data system in Oakland.

The data migration manager (300) determines that no event occurrences are predicted to take place in Milwaukee. Based on this determination, the data migration manager (300) selects the local data system located in Milwaukee as the migration destination for the application data of the local data system in Oakland.

Further, the migration policies specifies a priority of one for application B (i.e., high priority) and a relative priority of two for application C (i.e., medium priority). As such, the data migration determines to migrate the application data of application B first before migrating the application data of application C.

FIG. 3C shows a third diagram of the example system. The data migration manager (300) initiates the data migration by sending a migration request to local data system C (326) located in Oakland [3]. The migration request specifies first sending the application data of application B (326B) to local data system D (328) located in Milwaukee and then sending the application data of application C to local data system D (328).

After the migration request is obtained by local data system C (326), the local data system (326) migrates the application data of application B (326B) to local data system D (328) [4]. After the data is migrated, the local data system (326) sends the application data of application C (326C) to local data system D (328) [5].

Because the impact predictions for the event occurrences of New York City and Tampa did not meet or exceed the corresponding impact thresholds, the application data in local data systems A (322) located in New York City and B (324) located in Tampa are not migrated to another local data system.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the orchestration of data in multiple geographically-dispersed local data systems. Embodiments of the invention may track and monitor real-life events from external sources and implement migration policies when there is a potential threat to the data in the local data systems. Embodiments utilize the migration policies to prioritize the data that is to be migrated and analyze whether it is truly beneficial to execute the data migration, as migrating datasets from one local data system to another geographically-distant local data system may be costly.

Embodiments of the invention include using a machine learning algorithm to generate the impact predictions. The machine learning model generated as a result of implementing the machine learning algorithm is updated based on the results of the real-life events compared to the previous predictions. In this manner, as embodiments of the invention implement the machine learning algorithm, the accuracy of such impact predictions increases with each iteration.

Thus, embodiments of the invention may address the problem of inefficient use of computing resources. This problem arises due to the technological nature of the environment in which data is managed are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a data migration manager, a notification of an event occurrence from an external event source, wherein the event occurrence is predicted to take place in a geographical location;
performing, using a threat assessment model, a threat assessment on the event occurrence to generate an impact prediction for a local data system located in the geographical location;
making a first determination that the impact prediction exceeds an impact threshold for a first application executing in the local data system;
performing, in response to the first determination, a location assessment to identify a migration destination for first application data stored in the local data system, wherein the location assessment comprises:
making a second determination, using the impact prediction, that the event occurrence is predicted to impact the local data system;
making a third determination that no event occurrence is predicted to impact the migration destination; and
based on the second and the third determination, identifying the migration destination;
initiating, based on the location assessment, a first data migration of the first application data to the migration destination;
tracking the event occurrence during the first data migration to obtain event telemetry information; and
updating the threat assessment model based on the telemetry information to obtain an updated threat assessment model.

2. The method of claim 1, further comprising:
making a fourth determination that the first application has a higher priority than a second application executing on the local data system; and
in response to the fourth determination, initiating a second data migration of second application data to the migration destination after the first data migration is complete,
wherein the first application data is associated with the first application, and
wherein the second application data is associated with the second application.

3. The method of claim 2, wherein the fourth determination is based on application information obtained from the local data system.

4. The method of claim 1, wherein performing the threat assessment on the event occurrence to generate the impact prediction comprises:

inputting a set of characteristics of the event occurrence into the threat assessment model to generate a result,
wherein the threat assessment model is generated based on a machine learning algorithm, and
wherein the result is the impact prediction.

5. The method of claim 4, wherein the set of characteristics of the event occurrence comprise of at least one of: a type of event, a severity of the event, and a predicted radius of the event.

6. The method of claim 4, wherein the impact prediction is a percentage.

7. The method of claim 4, the method further comprising:
obtaining event telemetry information associated with the event occurrence; and
updating the threat assessment model based on the event telemetry information.

8. A non-transitory computer readable medium comprising computer readable program code, which when executed by a computer processor enables the computer processor to perform a method for managing data, the method comprising:
obtaining a notification of an event occurrence from an external event source, wherein the event occurrence is predicted to take place in a geographical location;
performing, using a threat assessment model, a threat assessment on the event occurrence to generate an impact prediction for a local data system located in the geographical location;
making a first determination that the impact prediction exceeds an impact threshold for a first application executing in the local data system;
performing, in response to the first determination, a location assessment to identify a migration destination for first application data stored in the local data system, wherein the location assessment comprises:
making a second determination, using the impact prediction, that the event occurrence is predicted to impact the local data system;
making a third determination that no event occurrence is predicted to impact the migration destination; and
based on the second and the third determination, identifying the migration destination;
initiating, based on the location assessment, a first data migration of the first application data to the migration destination;
tracking the event occurrence during the first data migration to obtain event telemetry information; and
updating the threat assessment model based on the telemetry information to obtain an updated threat assessment model.

9. The non-transitory computer readable medium of claim 8, the method further comprising:
making a fourth determination that the first application has a higher priority than a second application executing on the local data system; and
in response to the fourth determination, initiating a second data migration of second application data to the migration destination after the first data migration is complete,
wherein the first application data is associated with the first application, and
wherein the second application data is associated with the second application.

10. The non-transitory computer readable medium of claim 9, wherein the fourth determination is based on application information obtained from the local data system.

11. The non-transitory computer readable medium of claim 8, wherein performing the threat assessment on the event occurrence to generate the impact prediction comprises:
inputting a set of characteristics of the event occurrence into the threat assessment model to generate a result,
wherein the threat assessment model is generated based on a machine learning algorithm, and
wherein the result is the impact prediction.

12. The non-transitory computer readable medium of claim 11, wherein the set of characteristics of the event occurrence comprise of at least one of: a type of event, a severity of the event, and a predicted radius of the event.

13. The non-transitory computer readable medium of claim 11, wherein the impact prediction is a percentage.

14. The non-transitory computer readable medium of claim 11, the method further comprising:
obtaining event telemetry information associated with the event occurrence; and
updating the threat assessment model based on the event telemetry information.

15. A system, comprising:
a processor; and
memory comprising instructions, which when executed by the processor, perform a method for managing data, the method comprising:
obtaining a notification of an event occurrence from an external event source, wherein the event occurrence is predicted to take place in a geographical location;
performing, using a threat assessment model, a threat assessment on the event occurrence to generate an impact prediction for a local data system located in the geographical location;
making a first determination that the impact prediction exceeds an impact threshold for a first application executing in the local data system;
performing, in response to the first determination, a location assessment to identify a migration destination for first application data stored in the local data system, wherein the location assessment comprises:
making a second determination, using the impact prediction, that the event occurrence is predicted to impact the local data system;
making a third determination that no event occurrence is predicted to impact the migration destination; and
based on the second and the third determination, identifying the migration destination;
initiating, based on the location assessment, a first data migration of the first application data to the migration destination;
tracking the event occurrence during the first data migration to obtain event telemetry information; and
updating the threat assessment model based on the telemetry information to obtain an updated threat assessment model.

16. The system of claim 15, the method further comprising:
making a fourth determination that the first application has a higher priority than a second application executing on the local data system; and
in response to the fourth determination, initiating a second data migration of second application data to the migration destination after the first data migration is complete,
wherein the first application data is associated with the first application, and wherein the second application data is associated with the second application.

17. The system of claim 16, wherein the fourth determination is based on application information obtained from the local data system.

18. The system of claim 15, wherein performing the threat assessment on the event occurrence to generate the impact prediction comprises:
   inputting a set of characteristics of the event occurrence into the threat assessment model to generate a result,
   wherein the threat assessment model is generated based on a machine learning algorithm, and
   wherein the result is the impact prediction.

19. The system of claim 18, wherein the set of characteristics of the event occurrence comprise of at least one of: a type of event, a severity of the event, and a predicted radius of the event.

20. The system of claim 18, the method further comprising:
   obtaining event telemetry information associated with the event occurrence; and
   updating the threat assessment model based on the event telemetry information.

\* \* \* \* \*